US011477165B1

(12) United States Patent
McDowall et al.

(10) Patent No.: US 11,477,165 B1
(45) Date of Patent: Oct. 18, 2022

(54) SECURING CONTAINERIZED APPLICATIONS

(71) Applicant: Palo Alto Networks, Inc., Santa Clara, CA (US)

(72) Inventors: John Edward McDowall, Redwood City, CA (US); Sharad Saha, Santa Clara, CA (US); Nilesh Bansal, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/334,485

(22) Filed: May 28, 2021

(51) Int. Cl.
*H04W 12/30* (2021.01)
*H04W 12/08* (2021.01)
*H04W 12/088* (2021.01)
*H04L 9/40* (2022.01)
*G06F 9/455* (2018.01)

(52) U.S. Cl.
CPC ...... *H04L 63/0245* (2013.01); *G06F 9/45558* (2013.01); *H04L 63/02* (2013.01); *H04L 63/14* (2013.01); *H04L 63/1408* (2013.01); *H04L 63/1441* (2013.01); *H04L 63/20* (2013.01); *H04W 12/08* (2013.01); *H04W 12/088* (2021.01); *H04W 12/30* (2021.01); *G06F 2009/45587* (2013.01); *G06F 2009/45595* (2013.01)

(58) Field of Classification Search
CPC ..... H04L 63/0245; H04L 63/02; H04L 63/14; H04L 63/1408; H04L 63/1441; H04L 63/20; H04W 12/088; H04W 12/30; H04W 12/08; G06F 9/45558; G06F 2009/45587; G06F 2009/45595
See application file for complete search history.

(56) References Cited

U.S. PATENT DOCUMENTS

| 11,140,455 | B1* | 10/2021 | Woodruff | G06F 21/53 |
| 2014/0122435 | A1* | 5/2014 | Chavda | G06F 11/1451 707/645 |
| 2016/0149863 | A1* | 5/2016 | Walker | H04L 63/0263 726/1 |
| 2016/0342801 | A1* | 11/2016 | Sreekanti | G06F 21/602 |
| 2018/0063195 | A1* | 3/2018 | Nimmagadda | H04L 63/0263 |
| 2019/0012162 | A1* | 1/2019 | Vaikar | G06F 11/1433 |
| 2020/0274852 | A1* | 8/2020 | Ahmed | H04L 63/0263 |

(Continued)

OTHER PUBLICATIONS

Github, cni/SPEC.md at Master, containemetworking/cni, Container Network Interface (CNI) Specification, downloaded May 18, 2021.

(Continued)

*Primary Examiner* — Theodore C Parsons
*Assistant Examiner* — Howard H. Louie
(74) *Attorney, Agent, or Firm* — Van Pelt, Y & James LLP

(57) ABSTRACT

Techniques for securing containerized applications are disclosed. In some embodiments, a system, process, and/or computer program product for securing containerized applications includes detecting a new application container (e.g., an application pod); deploying a security entity (e.g., a firewall) to the application container; and monitoring all traffic to and from the application container (e.g., all layer-7 ingress, egress, and east-west traffic associated with the application container) using the security entity to enforce a policy.

20 Claims, 10 Drawing Sheets

(56) References Cited

U.S. PATENT DOCUMENTS

2021/0271777 A1* 9/2021 Netsch ............... G06F 21/6281

OTHER PUBLICATIONS

Istio, Istio Security, downloaded May 18, 2021.
Kubernetes, Network Plugins, downloaded May 18, 2021.
Mallu et al., Maintaining Transport Layer Security All the Way to Your Container: Using the Application Load Balancer with Amazon ECS and Envoy, May 29, 2020, pp. 1-22.
Park et al., Core Container Security Frameworks, International Journal of Advanced Research in Engineering and Technology (IJARET), vol. 11, Issue 6, Jun. 2020, pp. 1024-1038.
Wikipedia, Bump-in-the-Wire, page last edited Sep. 7, 2020.

* cited by examiner

US 11,477,165 B1

SECURING CONTAINERIZED APPLICATIONS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
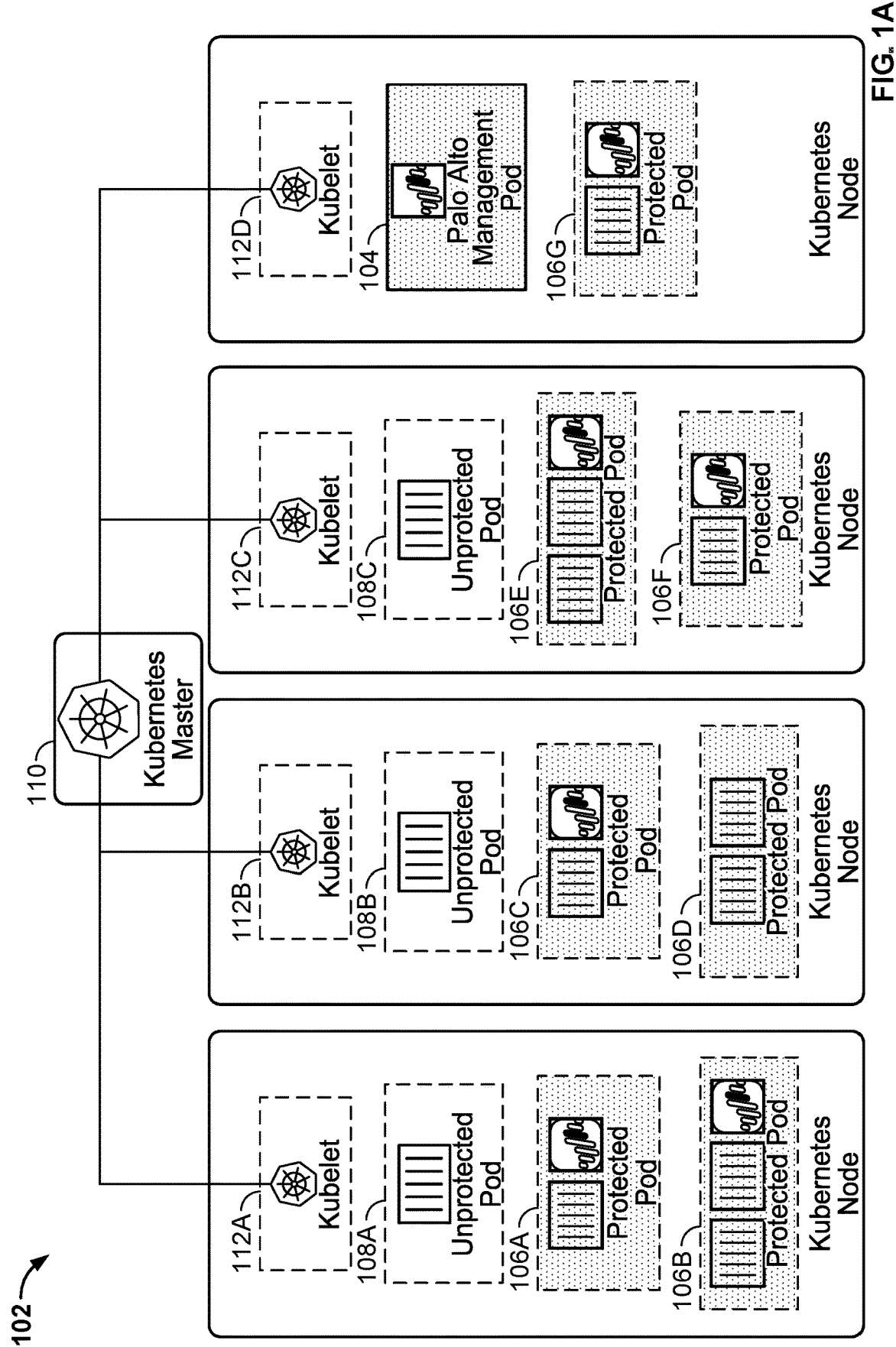
FIG. 1A is a block diagram of a security container deployment for a single firewall cluster in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business- relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tighlty integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar, or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Security Solutions for Virtualized Computing
Environments Security service providers offer various commercially available security solutions including various firewall, VPN, and other security related services. For example, some security service providers provide their customers with such security solutions including various firewall, VPN, and other security related services. However, the increasing proliferation of container environments (e.g., enterprise network environments and services executing applications in container-based environments, also referred to as containerized applications) presents new technical challenges for such security solutions.

Specifically, securing containerized application Layer-7 (L7) traffic in a container environment (e.g., in a Kubernetes cluster or another commercially available container environment) is technically challenging due to the complexity of effectively and efficiently inserting a security platform/solution (e.g., a commercially available firewall, such as a network gateway firewall (NGFW) from Palo Alto Networks, Inc. headquartered in Santa Clara, CA, or another commercially available security platform/solution) into the path of the network traffic of containerized applications.

Thus, what is needed are new and improved solutions to facilitate effective and efficient security platforms/solutions for securing containerized application Layer-7 (L7) traffic in a container environment.

Overview of Techniques for Securing Containerized Applications

Many enterprise network environments are moving to managed container service offerings as it generally reduces the complexity and operational overhead of managing, for example, a Kubernetes cluster by offloading much of that responsibility to a public cloud provider. Various managed container platforms are offered by different cloud service providers, such as the Google Kubernetes Engine (GKE), Microsoft Azure Container Service (AKS), Microsoft Azure Container Instances (ACI), Amazon Elastic Container Service for Kubernetes (Amazon EKS), and Amazon Fargate.

However, enterprises generally desire complete visibility and protection for inter pod and inter service traffic within these managed container services. They are further restricted with the network security options as each cloud service provider typically has their own networking infrastructure and mechanisms (e.g., interfaces or other solutions, such as container network interface (CNI) plugins) in which security needs to be enforced. As such, it is desired that a security solution can be provided for such environments in which the security (e.g., firewall) lifecycle and security policy provisioning can be integrated into various managed container service environments (e.g., and the container integration/container deployment (CI/CD) pipeline) to facilitate an automated security solution along with the application lifecycle in such container environments.

Accordingly, various techniques for securing containerized applications are disclosed.

In some embodiments, a system, process, and/or computer program product for securing containerized applications includes detecting a new application container (e.g., an application pod); deploying a security entity (e.g., a firewall) to the new application container; and monitoring all traffic to and from the application container (e.g., all layer-7 ingress, egress, and east-west traffic associated with the application container) using the security entity to enforce a policy (e.g., a security/firewall policy).

In some embodiments, a system, process, and/or computer program product for securing containerized applications further includes sending traffic log data from the security entity to a security management entity.

For example, the disclosed techniques for securing containerized applications can facilitate transparently inserting a security platform/solution into the path of the application layer network traffic in a container environment (e.g., including containerized application Layer-7 (L7) traffic in a container environment, such as within a Kubernetes Cluster or another commercially available container environment). Specifically, a security platform/solution such as a firewall can be transparently inserted into the path of all traffic for ingress, egress, and east-west flows without modification of the flows including the support for implementing and enforcing a policy (e.g., a network/security policy) on the flows to apply, for example, application identification (APP ID) and/or full threat inspection (e.g., using deep packet inspection (DPI) of the network traffic), such as will be further described below.

In an example implementation, the disclosed techniques for securing containerized applications can provide an inline security solution for the network traffic of the pods within a container environment, such as a Kubernetes cluster, including ingress flows, egress flows, and east-west traffic within the cluster. As such, the disclosed techniques for securing containerized applications provide security coverage of such flows and different types of network traffic seamlessly. Given that container environments such as Kubernetes are generally intended to enable simple deployment of applications that can be effectively treated as throw away pods rather than long-lived applications, the disclosed techniques not only facilitate seamless insertion into all such flows but can also be performed dynamically with no user intervention with the pods as they are created and destroyed (e.g., dynamic deployment and removal of the firewall with application pods), such as will be further described below.

As such, the disclosed techniques for securing containerized applications can facilitate seamless insertion. For example, the application pods do not necessarily have any visibility of the security being performed during execution (e.g., at runtime), because there is no sidecar container, IP tables, or any modification seen from inside the application pod, such as will be further described below.

Also, the disclosed techniques for securing containerized applications can facilitate strict inline security. For example, given that the application to the Kubernetes node's network/bridge connectivity (interface) passes through the firewall/security solution (e.g., PAN-OS) interfaces, the application pod generally cannot bypass the security, such as will be further described below.

Further, the disclosed techniques for securing containerized applications can generally cover all network traffic flows. For example, the disclosed security solution covers ingress, egress, and east-west traffic flows within the container environment (e.g., APP ID and threat inspection of ingress, egress, and east-west flows without modification of the flows in a container environment, such as a Kubernetes cluster without a requirement to change the Kubernetes infrastructure), such as will be further described below. The disclosed security solutions are also cloud native and can work with all container environment deployments (e.g., Kubernetes deployments), such as will also be further described below.

Moreover, the disclosed techniques for securing containerized applications can generally cover all network traffic types. For example, in contrast to various other security approaches that typically depend on a host's netfilter and specific protocol features and thereby secure only those types of traffic protocols (i.e., typically TCP options, no UDP coverage), interface-level plumbing enables security coverage for all types of network traffic, such as will be further described below.

In addition, the disclosed techniques for securing containerized applications can generally inspect all packets for a session. For example, given that a firewall (e.g., the PAN-OS firewall) is strict inline to all traffic leaving/entering the application pods, it enables the disclosed security solutions to inspect all packets for a session/flow and not just rely on TCP SYN packets, etc., such as will be further described below.

Also, the disclosed techniques for securing containerized applications can facilitate enhanced security performance for container environments. Other approaches are typically implemented as a network proxy, such as envoy. These approaches generally require all traffic flows to be terminated and re-established, which adds significant overhead to the traffic. In contrast, the disclosed security solution uses RAW sockets, and as such there is a reduction in latency and better throughput.

Further, the disclosed techniques for securing containerized applications can utilize a single firewalling agent on each node. As such, unlike some other sidecar-based approaches, there is only one firewall executing per node, such as will be further described below.

Most of the current security approaches for container environments also rely on IP tables/netfilters or Berkeley Packet Filter (BPF) filters on the nodes to implement network policies. This solution does not interfere with any of those and can work in conjunction with such existing solutions. Also, the disclosed security solution does not rely on IP tables/netfilters or BPF filters for redirecting traffic, and as such, the blast radius for add/delete changes to IP tables does not increase as new pods/services are deployed.

Accordingly, various techniques for securing containerized applications are disclosed as will also be further described below.

Example System Embodiments for Securing Containerized Applications

FIG. 1A is a block diagram of a security container deployment for a single firewall cluster in accordance with some embodiments. In this example, the security solution is deployed in a Kubernetes Cluster including a Kubernetes Master 110 and Kubelets 112A-D. Referring to FIG. 1A, a Kubernetes cluster 102 with a single Management Plane shown as Management Pod 104 is provided for securing selected Protected Pods 106A-G and the remaining Pods 108A-C are not protected as shown.

In an example implementation, the security management plane and security data plane of the current virtual machine (VM) image are separated and deployed into separate containers. The Management Plane (MP) container (e.g., deployed as a stateful service) can manage a number of Data Plane (DP) containers (e.g., capable of supporting 32 (or more) separate data plane containers). The management plane and data plane containers can communicate over a secure tunnel (e.g., an IPSec tunnel or another secure tunnel/communication mechanism). Each data plane container attached to a management container can operate completely independent of any other data plane container and have a separate lifecycle. In this example, all data plane containers attached to a management plane container have the same policy (e.g., firewall/security policy pushed to them). The management containers can be managed by a firewall/security management platform (e.g., using Panorama, which is commercially available from Palo Alto Networks, Inc. headquartered in Santa Clara, CA, deployed as a Virtual Machine (VM) or as a physical appliance, or using another commercially available firewall/security management platform), and each instance of that firewall/security management platform can manage, in this example, up to 1,000 (or more) management services (e.g., which can have, for example, one or two (or more) management plane pods).

In this example implementation, a Kubernetes Cluster deploys a service that supports a security management plane container. The user can either deploy a single management pod as a stateful service (e.g., as shown at 104 in FIGS. 1A and 1B) or deploy a fault tolerant pair on management pods. The management pod is generally deployed before any data plane pods. The administrator (e.g., security administrator) for the cluster will be able to selectively insert security to selected pods as shown in FIG. 1A or can split the security into different security management domains as shown in FIG. 1B.

For example, all traffic, URLs, and threat logs can be forwarded by the DP containers to the MP container it has registered with over the IPSec tunnel. The DP can insert its slot in the ingress and egress interface in the data plane logs before forwarding to the MP. All traffic logs can be maintained on the MP container to be forwarded to a security management platform (e.g., Panorama or another commercially available security management platform for firewalls, etc.). In this example, there are no logs stored on the DP container. Alternatively, logs can be cached on the DP container and then periodically forwarded to the MP container as similarly described above.

Figure 1B:
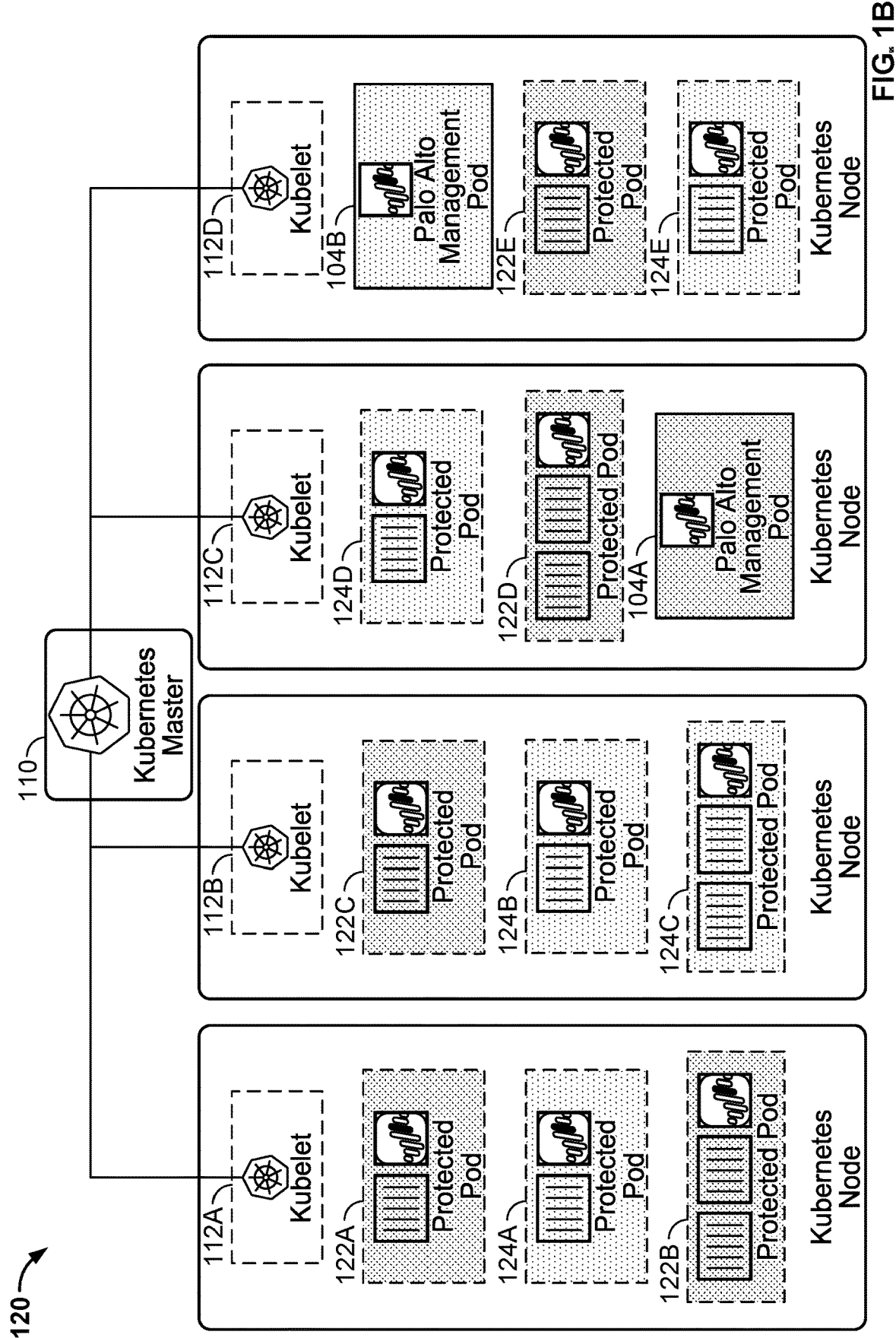
FIG. 1B is a block diagram of a security container deployment for two firewall clusters in accordance with some embodiments.

FIG. 1B is a block diagram of a security container deployment for two firewall clusters in accordance with some embodiments. In this example, the security solution is deployed in a Kubernetes Cluster including a Kubernetes Master 110 and Kubelets 112A-D. Referring to FIG. 1B, a Kubernetes cluster 120 with a single Management Plane that includes Management Pods 104A and 104B is provided for securing the pods in which the pods are split into different security management domains, as shown by Protected Pods 122A-E and Protected Pods 124A-E. In this embodiment, each separate set of MP/DP containers can be applied to either different policy domains (PCI or non-PCI) or different stages in the CI/CD pipeline, such as development versus production. The deployment configuration is flexible to enable users (e.g., network/security administrators) to design different scenarios.

Figure 1C:
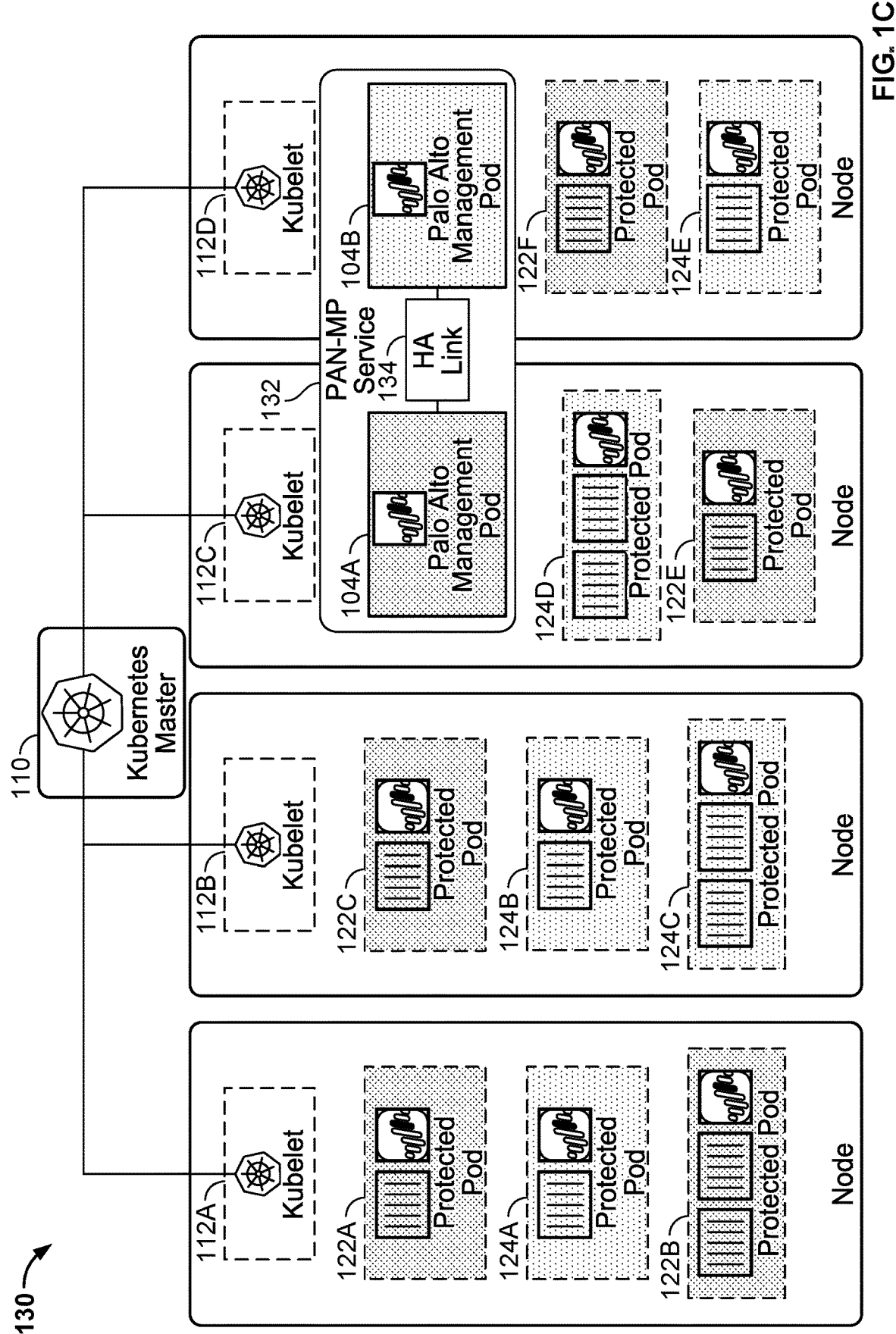
FIG. 1C is a block diagram of a security container deployment for two firewall clusters and a management plane high availability (HA) link in accordance with some embodiments.

FIG. 1C is a block diagram of a security container deployment for two firewall clusters and a management plane high availability (HA) link in accordance with some embodiments. In this example, the security solution is deployed in a Kubernetes Cluster including a Kubernetes Master 110 and Kubelets 112A-D. Referring to FIG. 1C, a Kubernetes cluster 130 with a Management Plane Service 132 that includes a Management Pod 104A and another Management Pod 104B connected by an HA Link 134 is provided for securing the pods in which the pods are split into different security management domains, as shown by Protected Pods 122A-F and Protected Pods 124A-E.

An example scenario for management plane failover is when there are two management pods deployed as an MP service. In this example, each of the management pods is active and each manages a set of Data Plane containers, such as shown in FIG. 1C. For instance, when MP Pod 104A fails, the service will restart it, and while MP Pod 104A is unavailable, the DP containers that were managed previously by MP Pod 104A, which in this example includes Protected Pods 122A-F, connect to MP Pod 104B. Once MP Pod 104A is back in service, the system will eventually load balance back to a steady state. Additional failure scenarios can similarly be handled using the disclosed HA security solution for containerized environments. First, the data plane instance may lose its heartbeat to its management plane for more than a preconfigured timeout window. For example, the timeout can be set to 10 seconds or can be configured by the administrator to another timeout setting. Second, the HA link between the two MPs can detect a failure in one of the MPs. Third, Kubernetes can detect a health-check failure on one of the MP pods. These and other failure scenarios can similarly be handled using the disclosed HA security solution for containerized environments as will now be further described below.

In the first example case, if the data plane detects a failure, then it attempts to perform a reconnect to the MP service. If one of the MP pods is available, then the reconnect will be successful, and the system will continue to operate. If neither of the MP pods is available, then the DP container will shut down, and the application pod will fail the Kubernetes health-check. This may result in a major service outage; however, this should only occur very infrequently as it would require the entire MP service to become unavailable.

In the second example case, if one of the MP pods fails, then the result will be the same as described above with respect to the first example case, and the system will recover as similarly described above.

In the third example case, if Kubernetes detects a failure as it will in the second example case, then it will attempt to deploy a new pod for the service. Once the new MP pod is available, it will start handling new requests (e.g., and potentially reconnect requests) to the MP service.

A technical challenge is that all these events occur in different timelines and there exists the potential for conflict. In an example implementation, the solution can be implemented to minimize the mean time to recovery (MTTR) of the DP-MP connection to prevent the DP from shutting down and also to minimize loss of traffic logging information.

If the health-check results for second and third example use cases is the same, then the problem can be simpler. If the second example case detects a failure, then Kubernetes will start the restart process to create a new MP pod for the service. While this is being performed, the existing DP pods connected to the failed MP pod can generally reconnect to the active MP pod, until the new MP pod is available.

Figure 2:
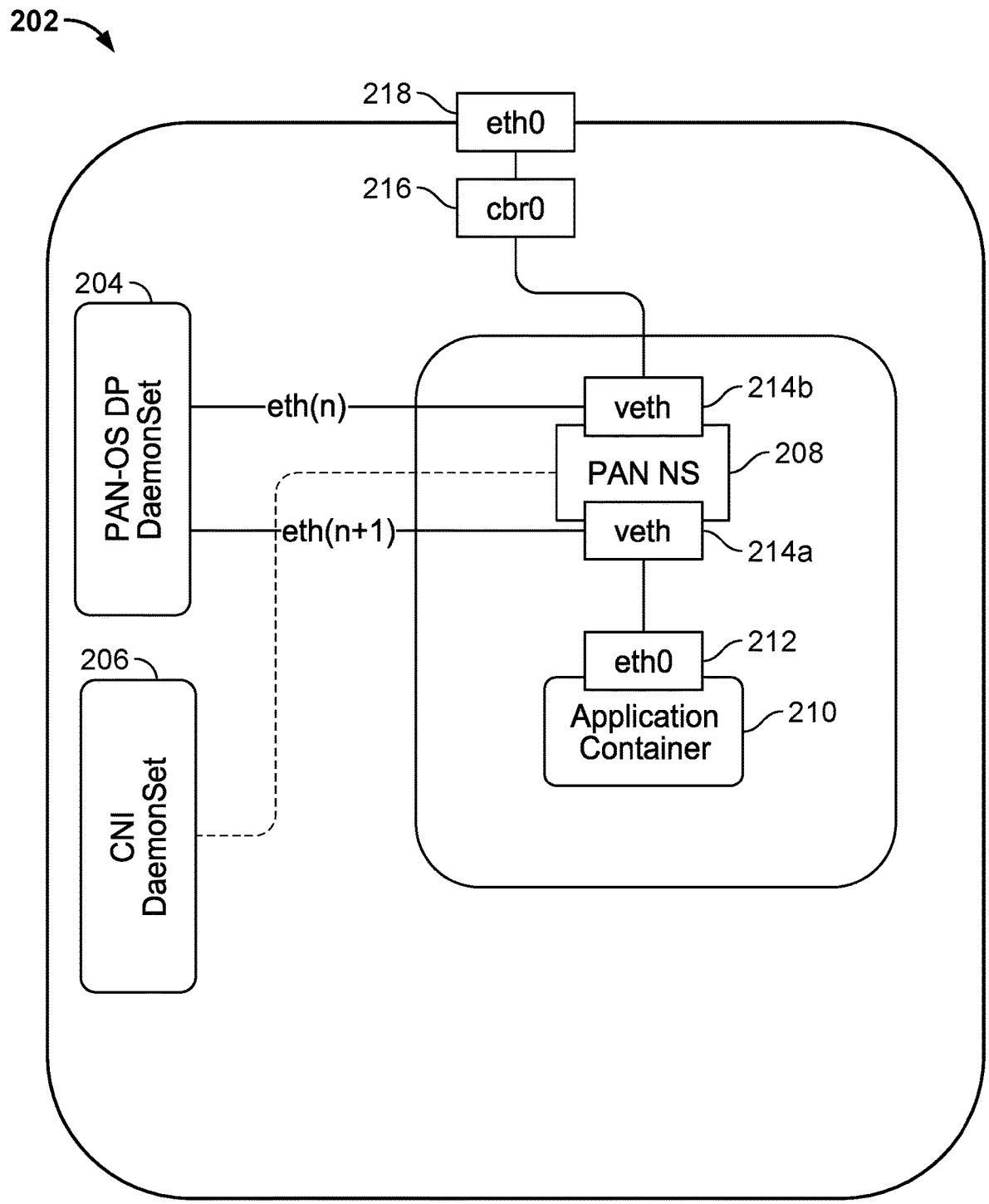
FIG. 2 is a block diagram of a system architecture for securing containerized applications in accordance with some embodiments.

FIG. 2 is a block diagram of a system architecture for securing containerized applications in accordance with some embodiments. In this example, the security solution is deployed in an application pod of a Kubernetes Cluster.

Referring to FIG. 2, two DaemonSets are deployed to each Node for which security (e.g., using a virtual Network Gateway Firewall (NGFW) security solution) is to be deployed, such as shown at Node 202 by NGFW OS (e.g., PAN-OS in this example implementation) Data Plane (DP) DaemonSet 204 and a Container Networking Interface (CNI) DaemonSet 206. PAN-OS DP DaemonSet 204 is shown in communication with a Linux network namespace (e.g., using PAN NS in this example) as shown at 208. As also shown, PAN NS 208, which includes a pair of veth interfaces 214a and 214b, is in communication with an Application Container 210. Specifically, PAN NS 208 is in communication with Application Container 210 via veth interface 214a of PAN NS 208 and eth0 interface 212 (e.g., an Ethernet interface) of Application Container 210. PAN NS 208 is also in communication with eth0 interface 218 of Node 202 via cbr0 216 (e.g., a Container Bridge, which is the software bridge within the node that connects all the container pods).

In this example implementation, the disclosed techniques for securing containerized applications can substantially increase the capacity of security platforms/solutions (e.g., Palo Alto Networks CN-Series platforms or other commercially available security platforms/solutions) by extending the existing Container Networking Interface (CNI) (e.g., CNI is an open specification, available at https://github.com/containernetworking/cni/blob/master/SPEC.md#container-network-interface-cni-specification, that enables pluggable networking implementations into containers and more specifically into Kubernetes containers, and CNI is supported on various commercially available cloud-based container environments, such as GKE, AWS, Azure, and OpenShift) to implement inspection of all traffic entering and leaving an application pod by the firewall (e.g., a PAN-OS-based firewall that is commercially available from Palo Alto Networks or another commercially available firewall), or any other Container Networking Function (CNF). Specifically, CNI chaining can be utilized to add a PAN-CNI plugin after the other CNIs. The PAN-CNI plugin creates a separate Linux network namespace (PAN-NS) on the Kubernetes node, and as a new application pod starts up, it moves the application pod's veth interface to the PAN-NS namespace (NS) and creates a new veth pair of interfaces between the PAN-NS and the application pod's network namespace. These two veth interfaces in the PAN-NS can then be used to insert strict inline security as will be further described below. In this example implementation, these are connected using the commercially available PAN-OS firewall virtual-wire technology and as such, the PAN-OS firewall becomes a strict inline security inspection of all traffic between the application pod and the Kubernetes node network. As a result, all traffic between the application pod and the Kubernetes node's network passes through the PAN-OS firewall.

Moreover, these changes are generally not visible to the application pod, further enhancing the security and transparency of the disclosed security solution techniques. When the application pod is removed, the veth pair of interfaces are removed thereby facilitating automated cleanup of the security solution in the container environment.

In another example implementation, the disclosed techniques for securing containerized applications are implemented by moving the node's/bridge's side veth to the Palo Alto Networks (PAN) NS namespace (NS) (PAN NS) and creating a new veth pair of interfaces between the PAN NS and the node's bridge. Such a mechanism can effectively be applied to all interfaces of the pod to similarly insert strict security for all interface traffic for the multi-interface pods.

In one embodiment, the process for adding security to Node 202 can be performed as follows. First, add a CNI plugin in standard CNI chaining on the Kubernetes node. Second, create a new Linux network namespace (e.g., using PAN-NS in this example) on the Kubernetes node (e.g., the DP container in this example is executed in a separate network namespace even though it is running in the pod's address space and is configured such that it can monitor all ingress and egress traffic in/from the pod while still being effectively transparent to the pod as further described below). Third, as a new application pod starts up, the PAN-CNI plugin moves the application pod's veth interface to the PAN-NS namespace (ethN) and creates a new veth pair of interfaces between PAN-NS (eth(n)/eth(n+1)) and the application pod's network namespace. Fourth, these two veth interfaces in the PAN-NS can then be used to insert strict inline security as similarly described above. Fifth, connecting these two interfaces using a PAN-OS firewall virtual-wire pair is performed (e.g., VWire is basically a bump in the wire in which the firewall does not alter the packet in anyway; the packet enters on one interface and is inspected by the firewall and if it is allowed it is sent to the other interface unchanged; however, if it violates a policy, then it will be dropped, see, e.g., https://en.wikipedia.org/wiki/Bump-in-the-wire). Sixth, all traffic between the application pod and the Kubernetes node's network passes through the PAN-OS firewall. Specifically, as shown in FIG. 2, all traffic (e.g., management plane and data plane ingress and egress traffic) passes through eth0 interface 212, and as such, all traffic now also passes through the PAN-OS firewall provided at 204 as shown in FIG. 2.

For example, using the disclosed techniques, a machine learning (ML)-powered, next-generation firewall (e.g., PAN-OS firewall, such as a CN-Series firewall available from Palo Alto Networks, Inc. headquartered in Santa Clara, CA) can be provided that is specifically built for container environments (e.g., Kubernetes or other commercially available container environments). Specifically, the disclosed security solution provides Layer-7 traffic visibility, including container source IP of outbound traffic to detect and prevent threats traveling between namespace boundaries. Further, the disclosed security solution enforces enterprise-level network security and threat protection in container traffic to help users elevate the overall security posture by sharing container (e.g., Kubernetes) contextual information with other security entities (e.g., other firewalls in the enterprise/container environment).

As an example use case scenario, using the above-described security solution, a customer can utilize a whitelist model that only allows traffic between container pods and services that have been approved by security admins with specific labels and tags.

As another example use case scenario, the L7 use cases can cover the inspection of all traffic and hence identifying the actual L7 application type which enables rules to be built on which types of applications can, for example, enter and leave a specific pod based on a configured security policy implemented by the firewall. In addition, the content of an L7 flow can be inspected for threats and malware to protect applications for malicious behavior. As would now be apparent to one of ordinary skill in the art, the disclosed techniques for securing containerized applications can similarly be applied to various other use case scenarios.

In an example implementation, each CNI plugin in the configured CNI plugin chain is executed in order by the container orchestration environment. For Kubernetes, each CNI plugin in the chain is executed by the kubelet process on the node where the pod is scheduled in the process space of the kubelet. In an example implementation, an Istio CNI plugin can handle pod add actions and create the traffic redirect setup in the pod's network namespace. Because each node's kubelet executes the Istio CNI plugin, installation of the Istio CNI plugin generally involves per node configuration and deployment of the plugin executable. The Istio-node daemonset performs the per-node installation of the Istio CNI plugin. The CNI architecture also returns the previous configuration steps in a JSON message. This is very useful for re-wiring the network as the information that is utilized to perform the veth and bridge manipulation is available to the "CMD_ADD" method. Once the pod has been created and the network namespace created, the network proxy can be executed in the new network namespace.

In this example implementation, when a pod is to be provided such security using the disclosed techniques for securing containerized applications, a label can be added to its YAML AIN'T MARKUP LANGUAGE (YAML) file, and the CNI wires the pod to the PAN-OS DP DaemonSet (e.g., this process can be performed transparently to the application pod, and in this example, no code changes (only a YAML Label) are added to the application pods) as will now be further described below.

In this example implementation, users can use these YAMLs to deploy the security solution/firewall (e.g., a CN-Series firewall as described above) on a given cloud platform quickly after filling in just these fields from their setup.

In pan-cni.yaml, pan-cn-mgmt.yaml and pan-cn-ngfw.yaml:
   image:<your-private-registry-image-path>
In pan-cn-mgmt-secret.yaml:
   PAN_PANORAMA_AUTH_KEY: <panorama-auth-key>
   # Thermite Certificate retrieval
   CN-SERIES-AUTO-REGISTRATION-PIN-ID: "<PIN Id>"
   CN-SERIES-AUTO-REGISTRATION-PIN-VALUE: "<PIN-Value>"
In pan-cn-mgmt-configmap.yaml:
   # Panorama settings
   PAN_PANORAMA_IP: <panorama-IP>
   PAN_DEVICE_GROUP: <panorama-device-group>
   PAN_TEMPLATE_STACK: <panorama-template-stack>
   PAN_CGNAME: <panorama-collector-group>
   # Intended License Bundle type—"CN-X-BASIC", "CN-X-BND1", "CN-X-BND2"
   # based on the authcode applied on the Panorama K8S plugin
   PAN_BUNDLE_TYPE: <license-bundle-type>

For an example production deployment, users can customize the YAMLs, such as the following. Resources (e.g., CPU, memory) fields in pan-cn-mgmt.yaml and pan-cn-ngfw.yaml are pre-populated with default parameters but can be customized to better suit the deployment scenario as similarly described herein. Also, there are some optional fields in the configmaps, which users can add, such as PAN_PANORAMA_IP2 for Panorama in HA, or CLUSTER_NAME for easier identification when managing multiple Kubernetes clusters under the same Panorama (e.g., a commercially available security management platform, available from Palo Alto Networks, Inc. headquartered in Santa Clara, Calif.).

Once the YAMLs have been modified as desired, these YAMLs can be deployed as shown in the below example.
   kubectl apply—f plugin-serviceaccount.yaml
   kubectl apply—f pan-cni-serviceaccount.yaml
   kubectl apply—f pan-mgmt-serviceaccount.yaml
   kubectl apply—f pan-cni-configmap.yaml
   kubectl apply—f pan-cni.yaml
   kubectl apply—f pan-cn-mgmt-secret.yaml
   kubectl apply—f pan-cn-mgmt-configmap.yaml
   kubectl apply—f pan-cn-mgmt.yaml
   kubectl apply—f pan-cn-ngfw-configmap.yaml
   kubectl apply—f pan-cn-ngfw.yaml To enable the security for the application pods, the following annotation can be applied to their YAMLs, or, to enable the security for all the pods in a given namespace, this annotation can be applied to the namespace: paloaltonetworks.com/firewall: pan-fw e.g., for "default" namespace.
   kubectl annotate namespace default paloaltonetworks.com/firewall=pan-fw OpenShift has multus CNI acting as a "meta-plugin," which calls other CNI plugins. To integrate the above-described example PAN-CNI plugin with such multus in the OpenShift container environment, these two extra steps can be performed for the application pods. First, a NetworkAttachmentDefinition "pan-cni" can be deployed in every app pod's namespace using kubectl apply -f pan-cni-net-attachdef.yaml -n <target-namespace>. Second, an annotation k8s.v1.cni.cncf.io/networks: pan-cni can be added in the YAML for the application pod.

Figure 3A:
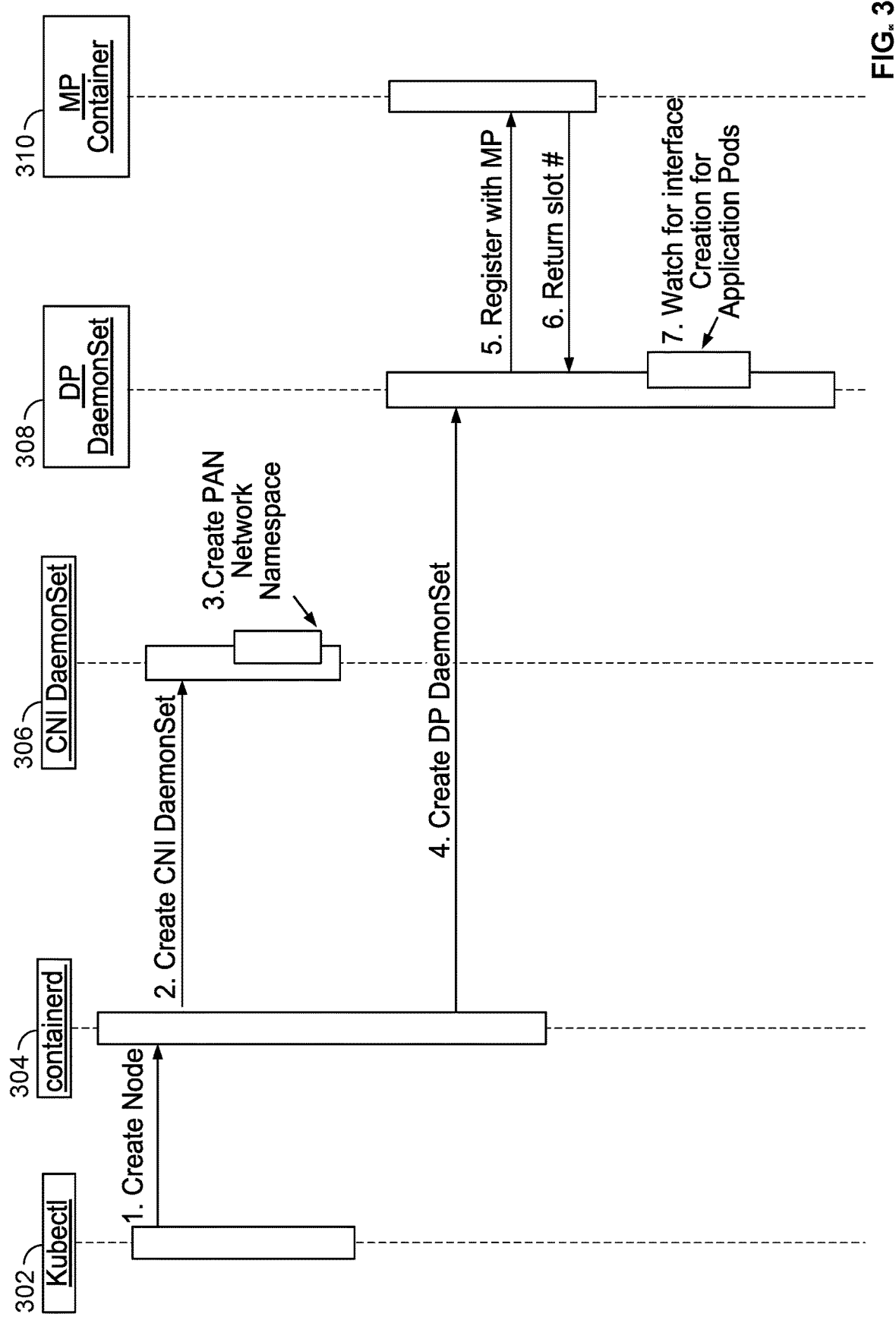
FIG. 3A is a sequence diagram for creating a Data Plane (DP) container in an application pod in accordance with some embodiments.

FIG. 3A is a sequence diagram for creating a Data Plane (DP) container in an application pod in accordance with some embodiments. To start the DP Container in a Kubernetes container environment, the Kubernetes CNI network plugins can be used as will now be described. Specifically, we create a CNI plugin to expose our resources. The resource here is mainly a new network namespace to which the DP application can be attached as similarly described above.

Referring to FIG. 3A, the sequence diagram generally illustrates the flow to start a new DP Daemonset in a Kubernetes container environment. Generally, prior to creating a new DP Daemonset, there should already be an available MP pod/service deployed, and the service name and a credential should be part of the configmap for the DP Daemonset. As shown at stage 1 of FIG. 3A, Kubectl 302 is invoked to create a new DP Daemonset. At stage 2,CNI Daemonset 306 is created using containerd 304. At stage 3, CNI Daemonset 306 allocates a new network namespace for the DP Daemonset 308 as shown. At stage 4, Kubectl 302 containerd is used to allocate a new DP DaemonSet. At stage 5, the DP Daemonset connects to its MP Container 310 and registers with the MP Container (e.g., passes, cores allocated, containerID, pod name, and possibly other labels/metadata to the MP Container). At stage 6, the MP Container returns a unique slot number to the DP Container that is used as an identifier in MP communication. Finally at Stage 7, the DP Daemonset monitors for new interface creation requests from the Kubernetes application pods.

Figure 3B:
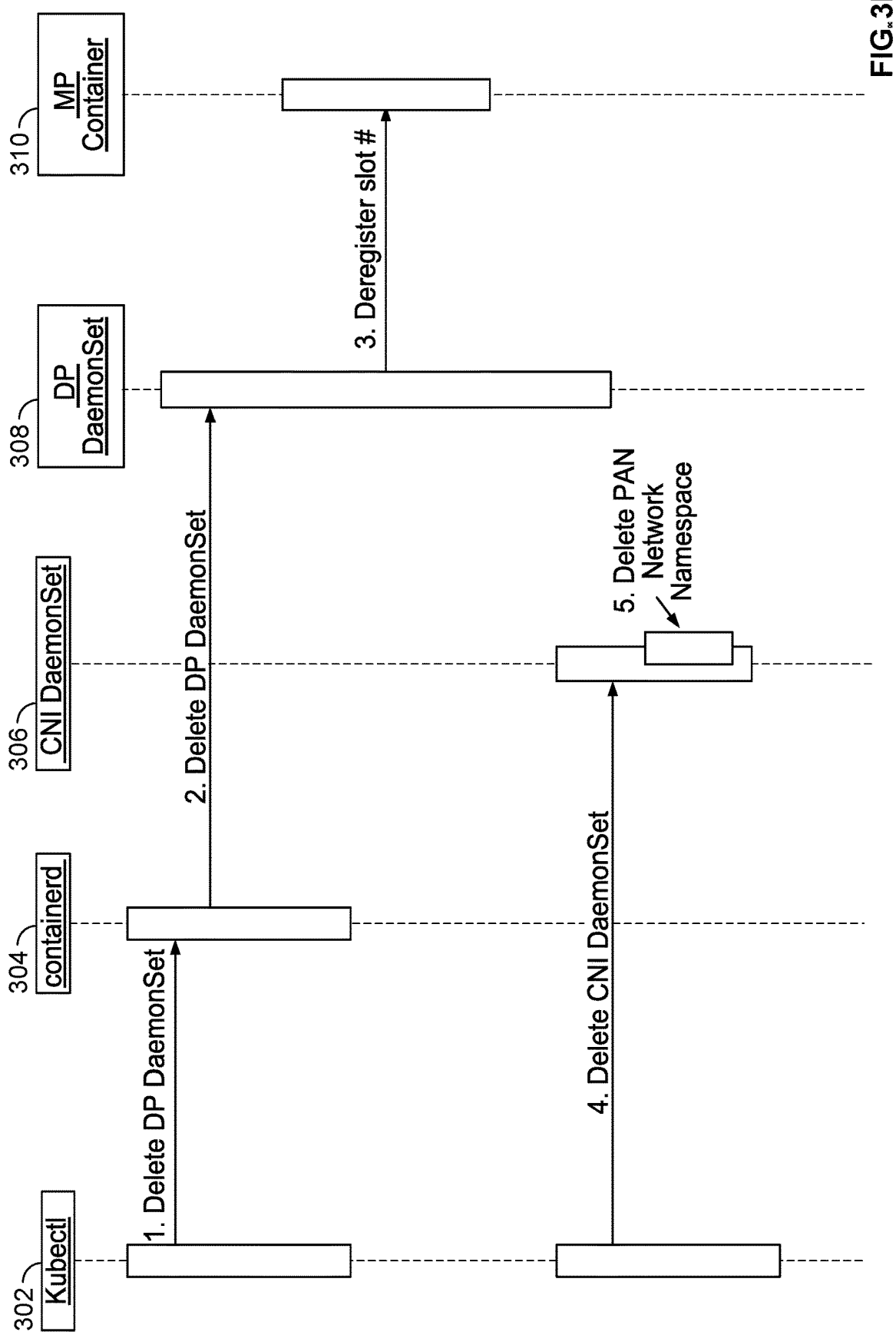
FIG. 3B is a sequence diagram for shutting down a Data Plane (DP) daemonset in a Node using Kubernetes in accordance with some embodiments.

FIG. 3B is a sequence diagram for shutting down a Data Plane (DP) daemonset in a Node using Kubernetes in accordance with some embodiments. The shutdown process of the DP Daemonset in an application pod using Kubernetes will now be described with respect to FIG. 3B. At stage 1, kubectl 302 issues a destroy request. At stage 2 a request from containerd 304 is sent to the DP Daemonset to shutdown. At stage 3, a notification is sent to the MP Container 310 that this slot if being removed. Otherwise, the MP Container can determine from Kubernetes that the pod has been removed. This includes the MP Container removing the pod and marks the resources free in the licensing service. At stage 4, the CNI Daemonset 306 receives a shutdown request from containerd 304. At stage 5, the CNI Daemonset 308 deletes the network namespace created for the firewall and shuts down the CNI Daemonset, and the CNI plugin deallocates the resources allocated to the DP container.

Figure 4A:
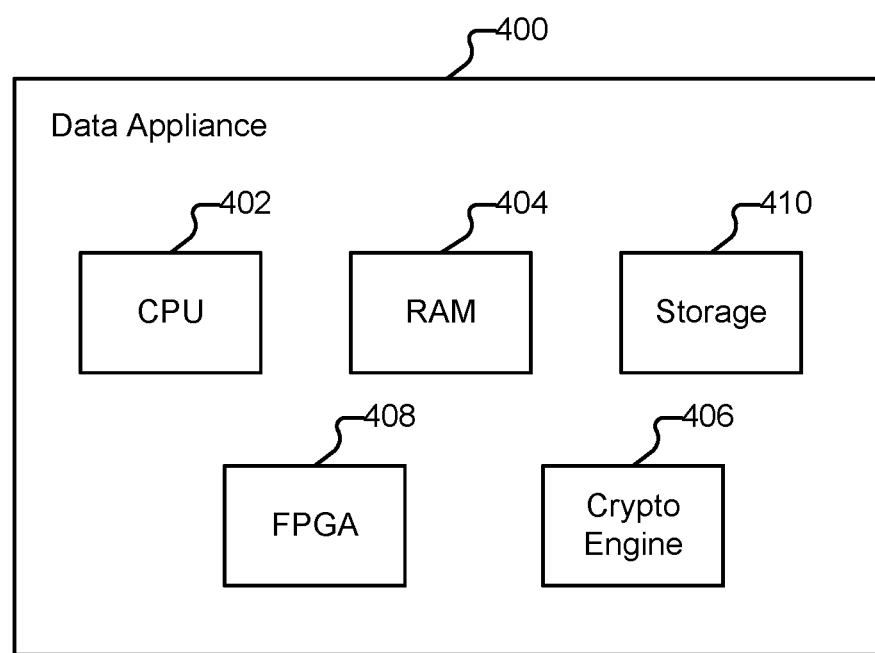
FIG. 4A illustrates an embodiment of a data appliance.

An embodiment of data appliance 400 is shown in FIG. 4A. The example shown is a representation of physical components that can be included in network gateway 400 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 4B:
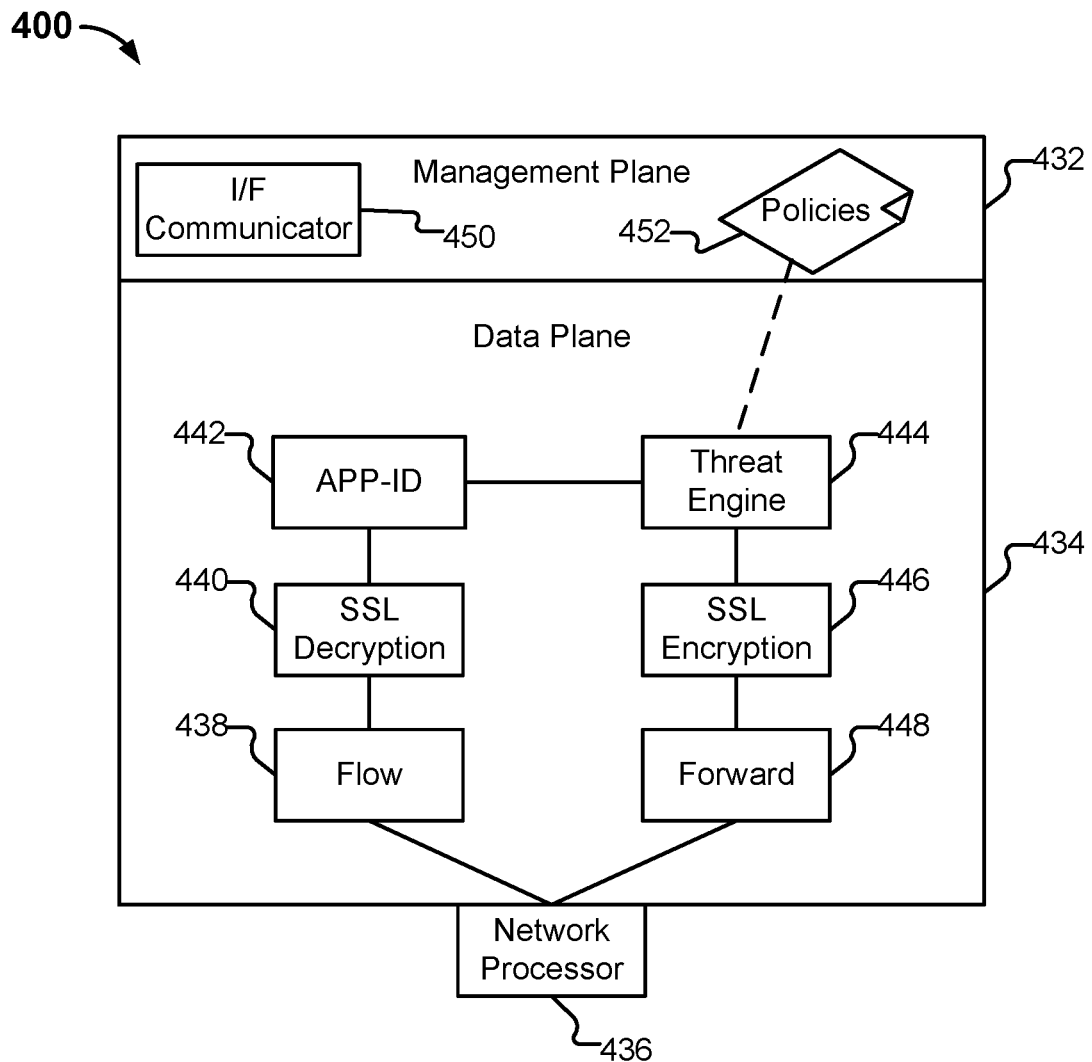
FIG. 4B is a functional diagram of logical components of an embodiment of a data appliance.

FIG. 4B is a functional diagram of logical components of an embodiment of a data appliance. The example shown is a representation of logical components that can be included in network gateway 400 in various embodiments. Unless otherwise specified, various logical components of network gateway 400 are generally implementable in a variety of ways, including as a set of one or more scripts (e.g., written in Java, python, etc., as applicable).

As shown, network gateway 400 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 400 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network.

Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 400. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification (APP-ID) engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

As will now be apparent, the above-described logical components of an embodiment of such an example data appliance for performing security/firewall policy enforcement can similarly be implemented in software, such as a virtual or container-based firewall implementation as similarly described herein for securing containerized applications.

Example process embodiments for securing containerized applications will now be further described below.

Example Process Embodiments for Securing Containerized Applications

Figure 5:
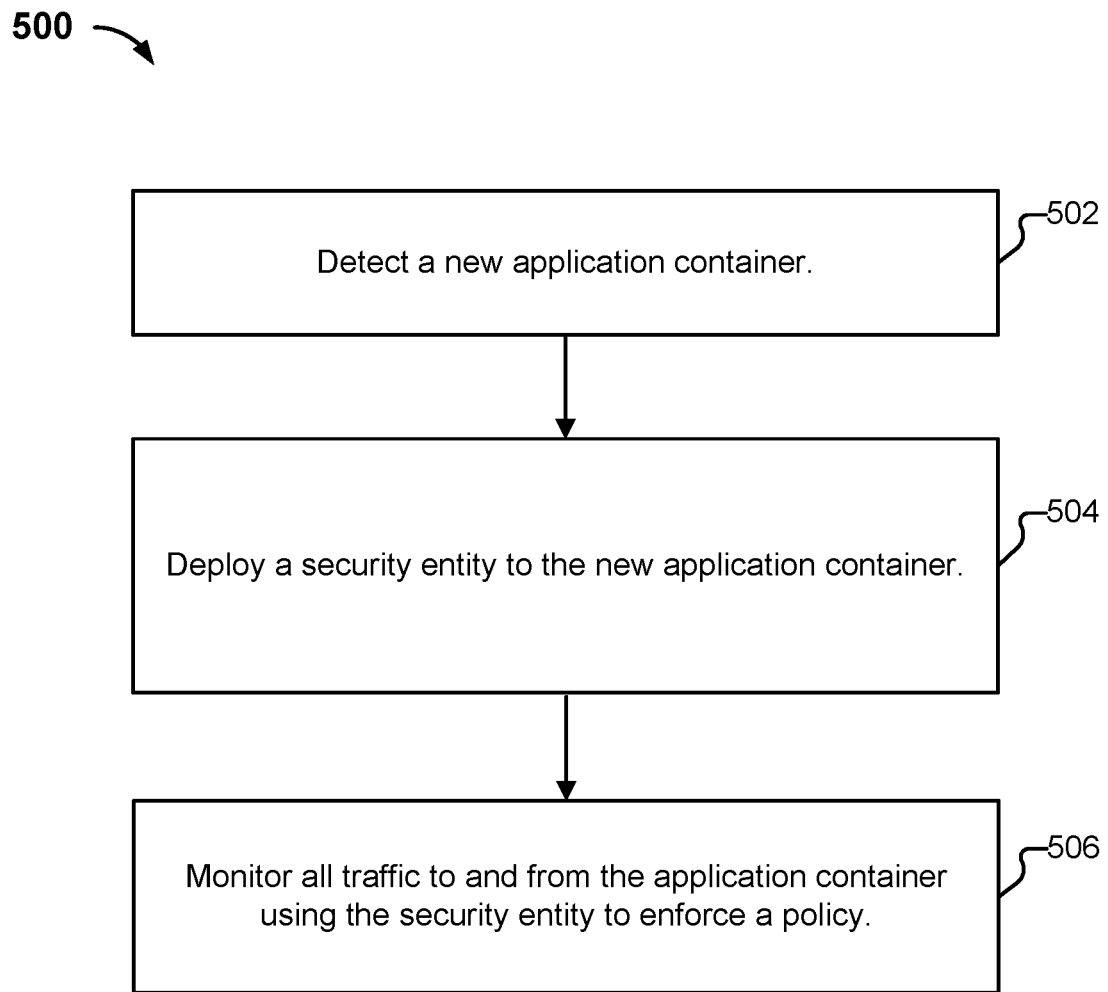
FIG. 5 is a flow diagram illustrating a process for securing containerized applications in accordance with some embodiments.

FIG. 5 is a flow diagram illustrating a process for securing containerized applications in accordance with some embodiments. In one embodiment, process 500 is performed using the system architectures described above (e.g., such as described above with respect to FIGS. 1A-4B).

The process begins at 502 when a new application container is detected. For example, the application container can be a containerized application executing in a cloud-based container service as similarly described above.

At 504, a security entity is deployed to the new application container. For example, the security entity can include a firewall that is seamlessly deployed in the application container to monitor all traffic (e.g., ingress, egress, and east-west traffic) of the application container as similarly described above.

At 506, the security entity monitors all traffic to and from the application container to enforce a policy. For example, the firewall deployed to the application container can inspect all traffic (e.g., ingress, egress, and east-west traffic) of the application container by inspecting the traffic (e.g., using deep packet inspection (DPI)) to enforce a security/firewall policy (e.g., based on APP-ID and/or other meta information associated with the network traffic) as similarly described above.

Figure 6:
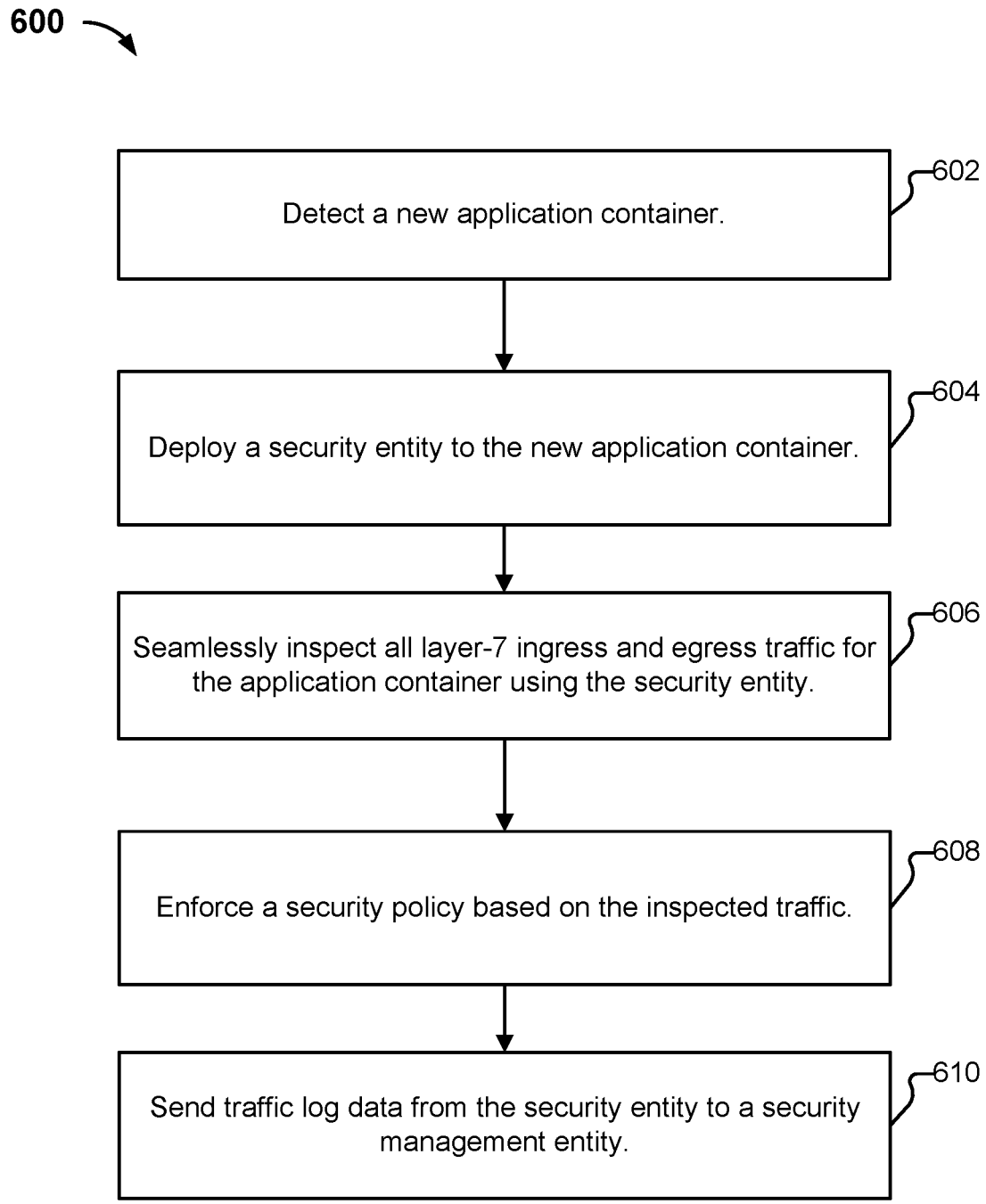
FIG. 6 is another flow diagram illustrating a process for securing containerized applications in accordance with some embodiments.

FIG. 6 is another flow diagram illustrating a process for securing containerized applications in accordance with some embodiments. In one embodiment, process 600 is performed using the system architectures described above (e.g., such as described above with respect to FIGS. 1A-4B).

The process begins at 602 when a new application container is detected. For example, the application container can be a containerized application executing in a cloud-based container service as similarly described above.

At 604, a security entity is deployed to the new application container. For example, the security entity can include a firewall that is seamlessly deployed in the application container to monitor all traffic (e.g., ingress, egress, and east-west traffic) of the application container as similarly described above.

At 606, the security entity seamlessly inspects all layer-7 (L7) ingress and egress traffic for the application container. For example, the security entity can be transparently deployed in the application container to seamlessly inspect all traffic including L7 application traffic for the application container (e.g., application pod) as similarly described above.

At 608, the security entity enforces a security policy based on the inspected traffic. For example, the firewall deployed to the application container can inspect all traffic (e.g., ingress, egress, and east-west traffic) of the application container by inspecting the traffic (e.g., using deep packet inspection (DPI)) to enforce a security/firewall policy (e.g., based on APP-ID and/or other meta information associated with the network traffic, such as for threat inspection/enforcement) as similarly described above.

At 610, the security entity sends traffic log data from the security entity to a security management entity. For example, the security entity can periodically send the traffic log data to a security management entity or send such traffic log data to the security management entity prior to the application container/pod being destroyed as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a processor configured to:
        detect a new application container;
        deploy a security entity to the application container into a path of application layer network traffic in a container environment for securing all network traffic types, wherein the security entity is transparently inserted into the path of all application layer network traffic for ingress, egress, and east-west flows without modification of the flows and without using a sidecar container or IP tables by performing the following:
            generate a new network namespace associated with the security entity on a node in the container environment; and
            move a side interface of the node to the new network namespace associated with the security entity and create a new pair of interfaces between the new network namespace and a network namespace associated with the application container, wherein the new pair of interfaces between the new network namespace associated with the security entity and the network namespace associated with the application container facilitate performing inline security in the container environment to detect and prevent threats traveling between namespace boundaries;
    monitor all traffic to and from the application container using the security entity to enforce a policy; and
    send traffic log data from the security entity to a security management entity, wherein the traffic log data is sent to the security management entity periodically and prior to the application container being destroyed; and
a memory coupled to the processor and configured to provide the processor with instructions.

2. The system recited in claim 1, wherein the security entity is a firewall.

3. The system recited in claim 1, wherein the policy is a security policy.

4. The system recited in claim 1, wherein the security entity is a firewall, and the policy is a firewall policy.

5. The system recited in claim 1, wherein the security entity is deployed to the application container dynamically with no user intervention with the application container as the application container is created and destroyed.

6. The system recited in claim 1, wherein monitoring all traffic to and from the application container includes an application identification associated with a flow determined using deep packet inspection.

7. The system recited in claim 1, wherein the application container is executed in a cloud-based container service.

8. The system recited in claim 1, wherein the application container is executed in a cloud-based container service that is provided using a public cloud service provider.

9. The system recited in claim 1, wherein the application container is executed in a cloud-based container service that is provided using a plurality of public cloud service providers.

10. The system recited in claim 1, wherein the policy is a firewall policy, wherein the processor is further configured to:
    inspect a packet using the security entity, and send the packet without any modifications if it is determined to not violate a security policy, and drop the packet if it is determined to violate the firewall policy.

11. A method, comprising:
    detecting a new application container;
    deploying a security entity to the application container into a path of application layer network traffic in a container environment for securing all network traffic types, wherein the security entity is transparently inserted into the path of all application layer network traffic for ingress, egress, and east-west flows without modification of the flows and without using a sidecar container or IP tables by performing the following:
        generating a new network namespace associated with the security entity on a node in the container environment; and
        moving a side interface of the node to the new network namespace associated with the security entity and creating a new pair of interfaces between the new network namespace and a network namespace associated with the application container, wherein the new pair of interfaces between the new network namespace associated with the security entity and the network namespace associated with the application container facilitate performing inline security in the container environment to detect and prevent threats traveling between namespace boundaries;
    monitoring all traffic to and from the application container using the security entity to enforce a policy; and
    sending traffic log data from the security entity to a security management entity, wherein the traffic log data is sent to the security management entity periodically and prior to the application container being destroyed.

12. The method of claim 11, wherein the security entity is a firewall, and the policy is a firewall policy.

13. The method of claim 11, wherein the security entity is deployed to the application container dynamically with no user intervention with the application container as the application container is created and destroyed.

14. The method of claim 11, wherein the application container is executed in a cloud-based container service.

15. The method of claim 11, wherein the application container is executed in a cloud-based container service that is provided using a public cloud service provider.

16. The method of claim 11, wherein the application container is executed in a cloud-based container service that is provided using a plurality of public cloud service providers.

17. The method of claim 11, wherein the policy is a firewall policy, further comprising:
    inspecting a packet using the security entity, and
    sending the packet without any modifications if it is determined to not violate a security policy, and dropping the packet if it is determined to violate the firewall policy.

18. A computer program product, the computer program product being embodied in a tangible non-transitory computer readable storage medium and comprising computer instructions for:
    detecting a new application container;
    deploying a security entity to the application container into a path of application layer network traffic in a container environment for securing all network traffic types, wherein the security entity is transparently inserted into the path of all application layer network traffic for ingress, egress, and east-west flows without modification of the flows and without using a sidecar container or IP tables by performing the following:
        generating a new network namespace associated with the security entity on a node in the container environment; and
        moving a side interface of the node to the new network namespace associated with the security entity and creating a new pair of interfaces between the new network namespace and a network namespace associated with the application container, wherein the new pair of interfaces between the new network namespace associated with the security entity and the network namespace associated with the application container facilitate performing inline security in the container environment to detect and prevent threats traveling between namespace boundaries;
    monitoring all traffic to and from the application container using the security entity to enforce a policy; and
    sending traffic log data from the security entity to a security management entity, wherein the traffic log data is sent to the security management entity periodically and prior to the application container being destroyed.

19. The computer program product recited in claim 18, wherein the security entity is a firewall, and the policy is a firewall policy.

20. The computer program product recited in claim 18, wherein the security entity is deployed to the application container dynamically with no user intervention with the application container as the application container is created and destroyed.

\* \* \* \* \*

UNITED STATES PATENT AND TRADEMARK OFFICE
CERTIFICATE OF CORRECTION

| | | |
|---|---|---|
| PATENT NO. | : 11,477,165 B1 | Page 1 of 1 |
| APPLICATION NO. | : 17/334485 | |
| DATED | : October 18, 2022 | |
| INVENTOR(S) | : John Edward McDowall, Sharad Saha and Nilesh Bansal | |

It is certified that error appears in the above-identified patent and that said Letters Patent is hereby corrected as shown below:

On the Title Page

Column 2, item (56), other publications, cite no. 1, delete "containemetworking/cni," and insert --containernetworking/cni--, therefor.

Signed and Sealed this
Twenty-first Day of November, 2023

*Katherine Kelly Vidal*

Katherine Kelly Vidal
*Director of the United States Patent and Trademark Office*